July 31, 1962 K. ŠTĚPÁNEK 3,047,802

ELECTROMECHANICAL SYSTEM FOR MEASURING OF ANGLES

Filed Feb. 23, 1960

INVENTOR.
Karel Štěpánek
BY Richard Chwat
Agt

United States Patent Office 3,047,802
Patented July 31, 1962

3,047,802
ELECTROMECHANICAL SYSTEM FOR MEASURING OF ANGLES
Karel Štěpánek, Prague, Czechoslovakia, assignor to Vyzkumny ustav obrabecich stroju a obrabeni, Prague, Czechoslovakia
Filed Feb. 23, 1960, Ser. No. 10,506
Claims priority, application Czechoslovakia Feb. 24, 1959
8 Claims. (Cl. 324—83)

The present invention relates to an electromechanical system for measuring of angles. There has been already proposed a system for measuring angles on the basis of a magnetic or optical record. The main feature of this system is a rotating disc with a record of a certain number of magnetic waves. The record is picked-up both by a stable pick-up head and by a rotatable pick-up head. The measured angle is determined by the readings of a computer and of a phasemeter. The drawback of this system is the need of a computer which is a relatively complicated electronic apparatus.

It is an object of this invention to provide a system for accurately measuring angles which requires no expensive and complicated apparatus, and which is exact and reliable under any operating conditions.

Figure 1:
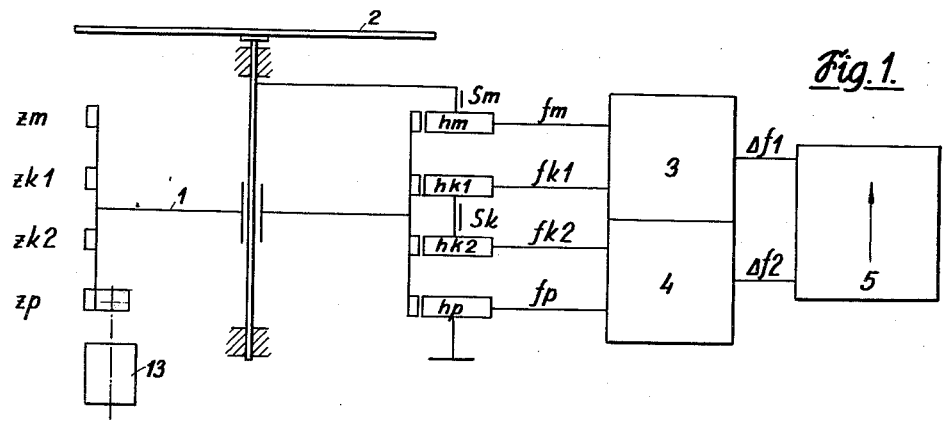
Figure 2:
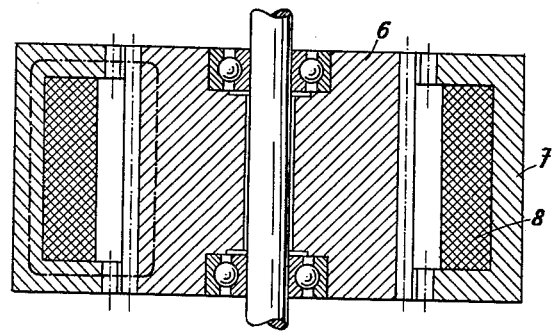
Figure 3:
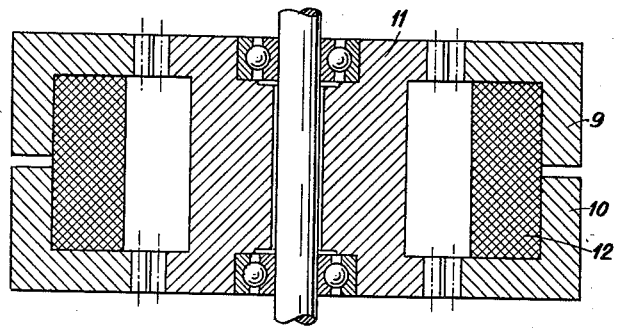

The above, and other objects, features and advantages of this invention, will be apparent in the following detailed description of illustrative embodiments which is to be read in connection with the accompanying drawings, where FIG. 1 schematically represents an electromechanical system for measuring angles, and FIGS. 2 and 3 are longitudinal sectional views of toothed generators which may replace the magnetic record on the rotating body of FIG. 1.

A recording body 1, which may be in the form of a cylinder, as shown, is rotatably driven at a constant speed by the electric motor 13 and has four recording traces, which are picked-up by four magnetophonic pick-up heads $hm$, $hk1$, $hk2$, $hp$. The measuring head $hm$ is mechanically connected with the measuring table 2 and can move with the latter during the measurement of angles, as hereinafter described. The compensating heads $hk1$, $hk2$ are mechanically linked to each other and can be freely angularly displaced about the axis of body 1 with respect to a scale $sk$. The fixed or reference pick-up head $hp$ is fixed on the frame of the apparatus.

The individual traces or tracks contain uniform records of certain numbers of sine shaped magnetic waves. In the given case the trace corresponding to the measuring head $hm$ has a record of $zm=360$ magnetic waves, the traces corresponding to the compensating heads $hk1$, $hk2$ the records of $zk1=380$, $zk2=381$ magnetic waves and the trace corresponding to the reference head $hp$ a record $zp=361$ magnetic waves.

In the course of measuring, the recording body 1 may be rotated at a constant speed of, for example, 10 revolutions per second.

In that case, the heads $hm$, $hk$, $hk2$ and $hp$ have voltages at the following frequencies induced therein: measuring frequency $fm=3600$ cycles, compensating frequencies $fk1=3800$ cycles and $fk2=3810$ cycles and a reference frequency $fp=3610$ cycles respectively.

The frequency couple $fk1$, $fm$ and the frequency couple $fk2$, $fp$ are supplied to frequency mixers 3 and 4, respectively, where they are subtracted. Thus, the frequency differences $\Delta f1 = fk1 - fm = 3800 - 3600 = 200$ cycles and $\Delta f2 = fk2 - fp = 3810 - 3610 = 200$ cycles, are obtained, and these coincident frequency differences $\Delta f1 = \Delta f2 = 200$ cycles are supplied to a phase meter 5.

If the measuring table 2 and consequently also the measuring head $hm$ are turned or angularly displaced about the axis of rotation of body 1 while the latter is rotating steadily, with such angular displacement corresponding to one recorded wave on track $zm$ in the case given through an angle of one degree, the phase displacement of the measuring frequency $fm$ with respect to the reference frequency $fp$ undergoes a change of 360°.

As according to known laws the phase displacement does not change in the course of adding or subtracting of frequencies, the phase displacement between the frequencies $\Delta f1$ and $\Delta f2$ also undergoes a change of 360°.

If the compensating heads $hk1$, $hk2$ are turned through an angle of one degree, the phase displacement of the compensating frequency $fk1$ with respect to reference frequency $fp$ changes $$360 \cdot \frac{380°}{360}$$

of the phase angle. In a similar way the phase displacement of the compensating frequency $fk2$ changes with respect to the reference frequency $fp$ for $$360 \cdot \frac{380°}{360}$$

of the phase angle. The phase displacement between the frequencies $\Delta f1$, $\Delta f2$ represents the difference of these both partial phase displacements and its value is therefore $381 - 380 = 1°$ of the phase angle. The change in the phase displacement due to the turning of the measuring head $hm$ is therefore 360 times the result of the same angular displacement of the connected together compensating heads $hk1$, $hk2$.

This fact can be made use of directly for the measuring of angles. The phase meter 5 serves solely as zero indicator, so that it is rather simple. The angles are measured in the following manner. The apparatus is provided with a measuring scale $sm$, associated with the measuring table 2. Both the scale $sm$ and the scale $sk$ are divided into 360 parts.

Both scales $sm$, $sk$ and the phase meter 5 are in the zero position prior to starting the measurement. After the table 2 has been turned through the angle that has to be measured, the compensating heads $hk1$, $hk2$ are turned until the phase meter again indicates zero. The measuring scale $sm$ then indicates the degree of the angular displacement of table 2 and the compensating scale $sk$ indicates the minutes and seconds of the angle. It is obvious that, in the case given each part of the measuring scale $sm$ corresponds to one degree of angular displacement of the measuring table 2 and each part or graduation of the compensating scale $sk$ (of equal magnitude as on the scale $sm$) corresponds to an angular displacement of ten seconds of the measuring table 2.

By selecting other numbers of magnetic waves on the records or tracks it is possible to achieve other sensitivities and other "transmission ratios" between the measuring and compensating scales. It is obvious from the above, that even when using for the record a small number of waves (360, 361, 380, 381) the sensitivity of such an arrangement is ten seconds and when using a nonius, we easily achieve the value of one second. This sensitivity is comparable to that achieved with the most perfect optical instruments.

The magnetic recording of such a small number of waves can be replaced by a mechanical arrangement having indentations corresponding to the waves. FIG. 2 shows a toothed rotor 6 of a toothed generator, which replaces the magnetic record and a toothed stator 7, which replaces the pick-up head. The stator is provided with a magnetising coil 8 which functions also as an induction coil. When the rotor 6 is turned the resistance of the magnectic circuit, shown on the drawing by a dash and dot line is changed, as is also the steady magnetic flux generated by the direct current passing through the coil 8. The changes of the magnetic flux induce a voltage in the coil 8, the frequency of which is determined by the number of teeth on rotor 6 and the rotational speed of the latter. The record 1 of FIG. 1 is replaced by four such toothed generators: the measuring, reference and two compensating generators. The accuracy of the measurement is not influenced by the replacement of the magnetic record by the toothed generators, for any inaccuracies in the locations of the teeth of the rotor 6 and of the stator 7 are mutually compensated. Furthermore the accuracy of the measuring of angles by this method does not depend up to a certain degree upon the accuracy of the division of the rotating disc. The replacement of the magnetic record, as in FIG. 2, by a mechanical "record" (or by an optical record, not shown) substantially increases the reliability of the apparatus and simplifies its electric part. The signals induced in the stator coils 8 (in the toothed generators) have such an intensity, that amplifiers are not required.

A further simplification can be achieved by interconnecting two stators, as in FIG. 3. The toothed stator has two independent parts 9, 10 with a different number of teeth on each, and such parts can be angularly displaced with respect to each other. Equal numbers of teeth are provided on the rotor 11. When incorporating such an arrangement in FIG. 1, twin stators, comprising 360, 380 and 361, 381 teeth, respectively, are provided. These twin stators are arranged in a way similar to that shown in FIG. 1, that is, with the stators corresponding to the compensating pick-up heads mechanically linked to each other. This arrangement substantially reduces the overall height of the apparatus. The voltage induced in the coil 12 of the twin stator 9—10 is composed of the voltage induced in its individual parts and, in a simple way, for example, by rectifying and filtering, it is possible to obtain the voltage at the required frequency difference ($\Delta f1$, $\Delta f2$).

It is possible to design on the basis of these principles highly accurate and reliable measuring and indexing apparatus. The electric reading method further permits easy preselection and automatic adjustment.

I claim:

1. An apparatus for measuring angles comprising a table supported for rotation about an axis perpendicular to the plane of said table, rotor means supported for rotation about an axis which coincides with said axis of rotation of the table, means operative to rotate said rotor means at a predetermined constant speed, means on said rotor means and pick-up means adjacent said rotor means cooperating, during rotation of said rotor means at said predetermined constant speed, to generate electrical impulses at a measuring frequency, a reference frequency and first and second compensating frequencies, respectively, said measuring frequency being different from said first compensating frequency and said reference frequency being different from said second compensating frequency by a value equal to the value of the difference between said measuring and first compensating frequencies, said pick-up means corresponding to both compensating frequencies being connected together and movable angularly about said axis of rotation of the rotor means, said pick-up means corresponding to the measuring frequency being connected to said table for rotation with the latter, and said pick-up means corresponding to said reference frequency being stationary, and means indicating the phase relationship between the difference between the measuring and first compensating frequencies and the difference between the reference and second compensating frequencies.

2. An apparatus as in claim 1; wherein said means on the rotor means consists of four magnetic recordings corresponding to said measuring frequency, said reference frequency and said compensating frequencies, respectively, and said pick-up means includes four magnetic pick-up heads positioned respectively adjacent said four magnetic recordings.

3. An apparatus as in claim 2; wherein each of said recordings includes a number of magnetic waves, the difference between the numbers of magnetic waves in said recordings corresponding to said first and second compensating frequencies being equal to the difference between the numbers of magnetic waves in said recordings corresponding to the measuring and reference frequencies.

4. An apparatus as in claim 1; further comprising a first scale cooperating with said pick-up means corresponding to the measuring frequency to indicate the degrees of angular displacement of said table, and a second scale cooperating with said pick-up means corresponding to the compensating frequencies to indicate relatively smaller graduations of said angular displacement as a function of the displacement of said pick-up means corresponding to said compensating frequencies required to restore a predetermined indication of said phase relationship.

5. An apparatus as in claim 1; wherein said means on the rotor means consist of optical records corresponding to said measuring, reference and compensating frequencies, and said pick-up means includes electro-optical pick-ups cooperating with the respective optical records.

6. An apparatus as in claim 1; wherein said means on the rotor means includes circumferentially arranged rows of radially projecting teeth, and said pick-up means includes stators having corresponding rows of radially projecting teeth, and coil means operatively associated with said stators to establish magnetic fields which encounter varying resistances to the magnetic flux during rotation of said rotor means relative to said stators and to act as induction coils in which voltages at the respective frequencies are generated.

7. An apparatus as in claim 6; wherein the stators corresponding to the measuring frequency and one of said compensating frequencies and the stators corresponding to the reference frequency and the other compensating frequency are operatively associated with first and second coils, respectively, constituting said coil means of the stator and in which voltages are generated at frequencies corresponding to said differences between the measuring and compensating frequencies and the reference and compensating frequencies, respectively.

8. An apparatus for measuring angles comprising a table mounted for turning through the angle to be measured about an axis of rotation perpendicular to the plane of said table, rotor means supported for rotation about an axis which coincides with said axis of rotation of the table, means operative to rotate said rotor means at a constant speed, first, second, third and fourth tracks on said rotor means representing predetermined numbers of impulses for each revolution of said rotor means, the difference between the numbers of impulses represented by said first and second tracks being equal to the difference between the numbers of impulses represented by said third and fourth tracks, first, second, third and fourth pick-up means disposed adjacent said first, second, third and fourth tracks and cooperating with the latter to generate electrical impulses at frequencies which are determined by the constant rotational speed of said rotor means and by the numbers of impulses represented by the respective tracks, said first pick-up means being turnable with said table about said axis of rotation of the latter, said second and third pick-up means being turnable together about said axis of the rotor means relative to the latter and the table, and said fourth pick-up means being stationary, first scale means having relatively large graduations to roughly indicate angles through which said table is turned, second scale means cooperating with said second and third pick-up means to show the extent of angular displacement thereof, and phase indicating means operative to show the phase relationship between the difference between the frequencies of electrical impulses from said first and second pick-up means and the difference between the frequencies of the electrical impulses from said third and fourth pick-up means.

References Cited in the file of this patent

UNITED STATES PATENTS

| | | |
|---|---|---|
| 2,349,663 | Langer | May 23, 1944 |
| 2,680,228 | Smith | June 1, 1954 |
| 2,717,987 | Hagen | Sept. 13, 1955 |
| 2,757,357 | Peterson | July 31, 1956 |
| 2,762,013 | Chandler | Sept. 4, 1956 |
| 2,786,978 | Warner | Mar. 26, 1957 |
| 2,900,595 | Mengel et al. | Aug. 18, 1959 |
| 2,934,824 | Braybrook et al. | May 3, 1960 |
| 2,937,239 | Garber et al. | May 17, 1960 |
| 2,940,171 | Steele | June 14, 1960 |

FOREIGN PATENTS

| 728,814 | Germany | Dec. 4, 1942 |
|---|---|---|